(12) United States Patent
Hofer

(10) Patent No.: US 9,920,255 B2
(45) Date of Patent: Mar. 20, 2018

(54) METHOD AND APPARATUS FOR ENERGY-EFFICIENT PROCESSING OF SECONDARY DEPOSITS

(75) Inventor: Wolfgang Hofer, Vienna (AT)

(73) Assignee: OMV REFINING & MARKETING GMBH, Vienna (AT)

( * ) Notice: Subject to any disclaimer, the term of this patent is extended or adjusted under 35 U.S.C. 154(b) by 573 days.

(21) Appl. No.: 14/115,764

(22) PCT Filed: May 4, 2012

(86) PCT No.: PCT/AT2012/000127
§ 371 (c)(1),
(2), (4) Date: Nov. 8, 2013

(87) PCT Pub. No.: WO2012/149590
PCT Pub. Date: Nov. 8, 2012

(65) Prior Publication Data
US 2014/0114098 A1    Apr. 24, 2014

(30) Foreign Application Priority Data

May 5, 2011    (AT) .................................. A 632/2011

(51) Int. Cl.
*C10G 1/10* (2006.01)
*C07C 4/22* (2006.01)
(Continued)

(52) U.S. Cl.
CPC ................. *C10G 1/10* (2013.01); *C08J 11/12* (2013.01); *C10G 1/02* (2013.01); *C10G 2300/1003* (2013.01); *C10G 2300/301* (2013.01); *C10G 2300/302* (2013.01); *C10G 2300/4081* (2013.01); *C10G 2300/44* (2013.01);
(Continued)

(58) Field of Classification Search
None
See application file for complete search history.

(56) References Cited

U.S. PATENT DOCUMENTS 4,642,401 A     2/1987   Coenen et al.
5,288,934 A *   2/1994   de Broqueville ......... C07C 1/00
                                                    585/240
(Continued)

FOREIGN PATENT DOCUMENTS

CN          1127519 A       7/1996
CN        101255343 A       9/2008
(Continued)

OTHER PUBLICATIONS

EP0659867 English Translation from EPO, Dec. 2, 2015.*
(Continued)

*Primary Examiner* — Philip Louie
(74) *Attorney, Agent, or Firm* — Nixon & Vanderhye P.C.

(57) ABSTRACT

Method for the depolymerization of plastics material (1), in particular pre- or post-consumer plastics wastes, by means of heat introduction, wherein the plastics material (1) is molten to form a plastics melt and degassed before being passed to a depolymerization reactor (3), adding a fraction obtained from crude oil as a solvent (6) to the plastics melt, thereby lowering the viscosity of the plastics melt solution supplied to the depolymerization reactor (3) relative to the viscosity of the plastics melt.

21 Claims, 1 Drawing Sheet

(51) Int. Cl.
*C10G 1/02* (2006.01)
*C08J 11/12* (2006.01)

(52) U.S. Cl.
CPC ........ *C10G 2400/02* (2013.01); *Y02P 20/129* (2015.11); *Y02W 30/703* (2015.05)

(56) References Cited

U.S. PATENT DOCUMENTS

| | | | |
|---|---|---|---|
| 6,861,568 B1* | 3/2005 | Guffey | C10G 1/10 521/44.5 |
| 2002/0169223 A1 | 11/2002 | Khan et al. | |
| 2003/0199718 A1 | 10/2003 | Miller | |
| 2007/0098625 A1 | 5/2007 | Adams et al. | |
| 2009/0062518 A1 | 3/2009 | Kasai et al. | |
| 2009/0062581 A1 | 3/2009 | Appel et al. | |
| 2012/0108863 A1* | 5/2012 | Tippet | B01J 8/062 585/241 |

FOREIGN PATENT DOCUMENTS

| | | |
|---|---|---|
| EP | 0 659 867 | 6/1995 |
| EP | 0 659 867 A2 | 6/1995 |
| EP | 0 814 143 | 12/1997 |
| JP | 49-62575 A | 6/1974 |
| JP | 6-128569 | 5/1994 |
| JP | 9-291288 | 11/1997 |
| JP | 10-237460 A | 9/1998 |
| JP | 2001-240873 | 9/2001 |
| JP | 2003-267896 A | 9/2003 |
| JP | 2007-524498 A | 8/2007 |
| JP | 2009-511734 A | 3/2009 |
| WO | WO 95/03375 A1 | 2/1995 |

OTHER PUBLICATIONS

Sinnott, R.K; Chemical Engineering Design, Coulson & Richardson's Chemical Engineering, vol. 6, Fourth Edition, 2005, p. 49-50.*
NIH, ChemIDplus—64741-57-7—Gas oils (petroleum), heavy vacuum, NIH TOXNET, ChemIDplus, Jun. 17, 2014.*
English Translation of the Written Opinion (IPRP Chapter I) for PCT/AT2012/000127, dated Nov. 14, 2013.
EP Office Action dated Mar. 3, 2014, from applicant's European Patent Application No. EP 12723076.1, corresponding to PCT/AT2012/000127 filed May 4, 2012.
International Search Report for PCT/AT2012/000127, dated Aug. 1, 2012.
Shabtai et al., Depolymerization-Liquefaction of Plastics and Rubbers. 1. Polyethylene, Polypropylene, and Polybutadiene, *Energy & Fuels*, 1997, 11, 76-87.
Austrian Search Report for AT 632/2011 dated Jan. 19, 2012.
Chinese Office Action dated Sep. 19, 2014.
European Office Action dated Jul. 22, 2014 issued in European Patent Application No. 12723076.1, 6 pp.
Notice of Reasons for Rejection dated Feb. 16, 2016, issued in Japanese Patent Application No. 2014-508644 and English translation.
Official Action dated Mar. 24, 2016, issued in Eurasian Patent Application No. 201391621/31.

* cited by examiner

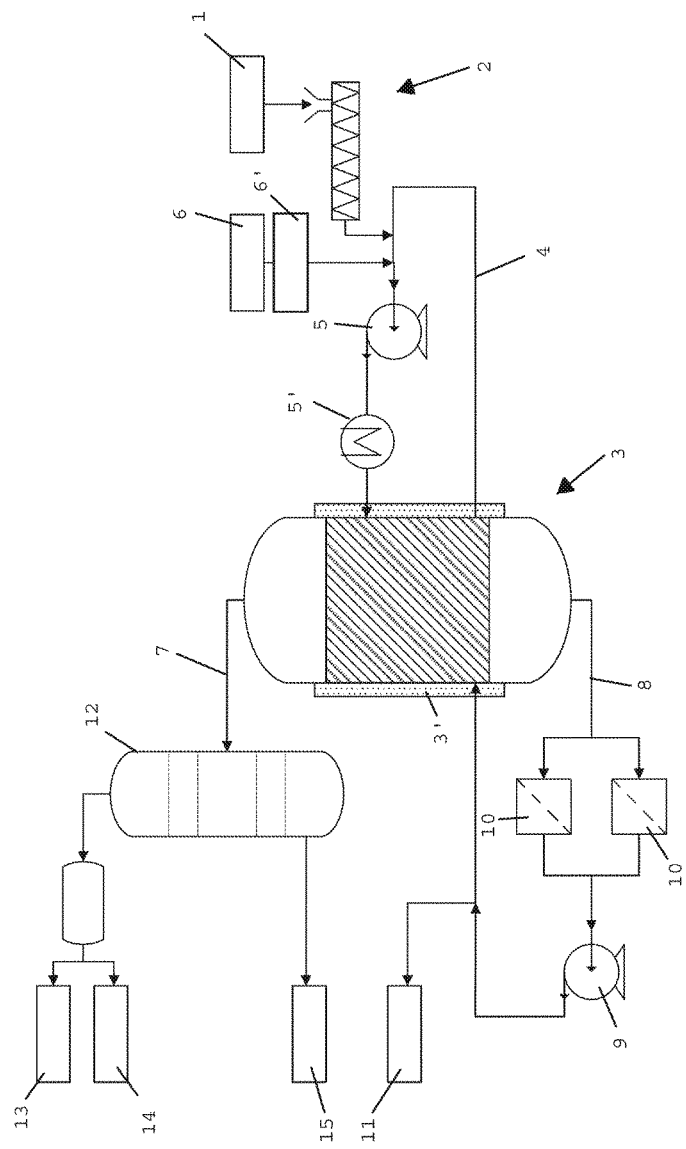

METHOD AND APPARATUS FOR ENERGY-EFFICIENT PROCESSING OF SECONDARY DEPOSITS

This application is the U.S. national phase of International Application No. PCT/AT2012/000127 filed 4 May 2012 which designated the U.S. and claims priority to AT Patent Application No. 632/2011 filed 5 May 2011, the entire contents of each of which are hereby incorporated by reference.

The invention relates to a method for the depolymerisation of plastics material, in particular pre- or post-consumer plastics wastes, by means of heat introduction, wherein the plastics material is molten to form a plastics melt and degassed before being passed to a depolymerisation reactor having a heating device. Furthermore, the invention relates to an apparatus for the depolymerisation of plastics material, in particular pre- or post-consumer plastics wastes, having a degassing and melting device for transforming the plastics material into a plastics melt, and a depolymerisation reactor.

Basically, oiling pre- or post-consumer plastics wastes in order to recycle the pre- or post-consumer plastics wastes is already known.

One known type of methods for the recycling of plastics are high-temperature pyrolysis methods, wherein the plastics material is treated in a temperature range of 600 to 1,000° C.; another known type of methods are low-temperature depolymerisation methods including cracking reactions that are usually performed in a temperature range of approx. 300 to 450° C. Especially in low-temperature depolymerisation, supplying energy to the molecules of the plastics material is difficult because the plastics melt exhibits high viscosity and plastics are poor heat conductors in general. As a consequence, only relatively small depolymerisation reactors with a turnover volume of up to approx. 6,000 tonnes per year could be created so far; large facilities have considerable problems regarding heat introduction. Moreover, an economical operation of facilities with a turnover volume in the range of 6,000 tonnes per year is hardly possible.

On the other hand, catalytic depolymerisation methods wherein the depolymerisation is performed by catalytic cracking are known from the publication Shabtai J. et al., Energy & Fuels 11 (1997): 76-87 or US 2002/169223 A1, for example.

An apparatus for the depolymerisation of pre- and post-consumer plastics wastes is known from the prior art, for example WO 95/32262, wherein a circuit system is connected to the reactor for gently heating the content of the reactor, and the content of the reactor is passed through an ascending slope integrated into the reactor for separating coarser particles of solids with an accordingly high settling speed before entering an extraction line.

Furthermore, an apparatus for the depolymerisation of organic and inorganic waste material which is chaffed and mixed with a solvent before adding water or the like to form a suspension and then fed into a depolymerisation stage, is known from U.S. Pat. No. 7,771,699 B2. Thereafter, solids are removed from this suspension.

A very similar method using an aqueous suspension that is supplied to the depolymerisation reactor is known from WO 2009/108761 A1.

Moreover, a method and an apparatus for the depolymerisation of plastics material wherein the reactor has a separating device for separating liquid plastics material from vaporous plastics material is known from US 2008/035079 A.

A disadvantage of all known depolymerisation methods and apparatuses is that—as has already been mentioned initially—heat transferal into the molecules of the plastics material is difficult, in particular with larger quantities.

As a consequence, the object of the present invention is to provide a method and an apparatus for the thermal depolymerisation of the initially mentioned type for improving heat introduction into the plastics material to be depolymerised. Thereby it should, in particular, be possible to perform depolymerisation reactions with a larger capacity in a reliable manner and thus depolymerise plastics material under economically acceptable conditions.

According to the invention this is achieved in the thermal depolymerisation method of the initially mentioned type by adding a fraction obtained from crude oil as a solvent to the plastics melt, thereby lowering the viscosity of the plastics melt solution supplied to the depolymerisation reactor relative to the viscosity of the plastics melt. By adding a solvent to the degassed and molten plastics material, i.e. the heated, non-solid plastics material, it is possible to lower the viscosity of the plastics melt and thus the heat introduction into the plastics material in the depolymerisation reactor may be improved. In this way, a thermal depolymerisation is performed without adding a catalyst, hydrogen or the like. The depolymerisation of the plastics material is thus carried out by thermal cracking and not by catalytic cracking. Advantageously, the fraction of crude oil provided as the solvent is residual oil from distillation and/or cracking facilities in the crude oil processing industry. During the introduction of the solvent, the plastics melt preferably has a temperature of at least 120° C., in particular between 150° C. and 300° C.; for obtaining a solution as homogeneous as possible, the solvent has advantageously been pre-heated to at least 150° C. as well, in particular substantially 200° C. to 300° C. Introducing a solution into the depolymerisation reactor results in a lower drop of the temperature gradient over the cross-section of the depolymerisation reactor and thus a considerably lower hazard of overheating the plastics material near the wall of the reactor, which is usually equipped with a heating device on its outside. In addition, the hazard of coking is reduced for the plastics material. Furthermore, the lowering of the viscosity with respect to the pure plastics melt may improve the pumpability of the plastics melt solution considerably, thus reducing the energy required for the operation of the depolymerisation reactor. Also, current depolymerisation reactors often require providing a central stirring device, which suffers from the disadvantage that it is subject to wear by extraneous material in the plastics melt. Lowering the viscosity has the advantage that the stirring device may be omitted to simplify operation and maintenance.

In order to obtain a mixing of the plastics material introduced into the depolymerisation reactor, it is advantageous to continuously pump plastics melt from the depolymerisation reactor and recirculate it into the depolymerisation reactor. Preferably, part of the content of the reactor is extracted in a lower part of the reactor above a reactor sump, and then recirculated into the reactor for further depolymerisation. Regarding a reliable mixing of the content within the depolymerisation reactor and the generation of turbulences inside the reactor, it is advantageous to continuously pump plastics melt from the depolymerisation reactor and recirculate it into the depolymerisation reactor.

In order to add a solvent to the plastics material that is recirculated via the supply circuit and thus create more favourable conditions for heat introduction in the depolymerisation reactor, it is advantageous to introduce, preferably inject, the solvent into the supply circuit. Introducing also the previously degassed and molten plastics material into the depolymerisation reactor via the supply circuit guarantees that newly introduced plastics material and plastics material pumped from the depolymerisation reactor via the supply circuit are first brought together and then the solvent is added to the merged melt material in order to secure the improved heat introduction in the reactor.

To make sure that the plastics material dissolves in the solvent, it is favourable for the solvent to be heated to preferably approx. at least 150° C., in particular substantially 200° C. to 300° C., before being added to the plastics melt.

Here, it is particularly advantageous to add a heavy oil as the solvent. Heavy oil (heavy fuel oil (HFO) and its components) is residual oil from distillation and/or cracking plants in the crude oil processing industry, which is currently sold mainly as fuel for diesel engines of ships and as combustible. Sales of heavy oil, however, are declining, which leads to excess capacities. Because of this, heavy oil may be used as a low-cost and also efficient solvent and/or viscosity-reducing agent for depolymerising plastics material. Furthermore, some heavy oils contain fine-grained residues of catalysts, which could have a favourable effect on the cracking behaviour during depolymerisation.

To prevent the solvent from vaporising immediately after introducing the plastics melt solution into the depolymerisation reactor, it is advantageous for the solvent to have a higher final boiling point than the operating temperature in the depolymerisation reactor. Accordingly it is advantageous for the solvent, preferably the heavy oil, to have a final boiling point of >300° C., preferably >350° C.

It has been found to be especially advantageous to use a heavy oil having a share of aromatic hydrocarbons of at least 25% as the solvent. In particular, a heavy oil or a mixture of different heavy oils having no. 265-xxx-x or no. 270-xxx-x according to the EINECS (European Inventory of Existing Commercial Chemical Substances) classification system may be used here, with x being a placeholder. Particularly preferred heavy oils are selected from a group consisting of EINECS Nos. 265-064-6, 265-058-3, 265-189-6, 265-045-2, 265-193-8, 265-081-9, 270-675-6, 265-060-4.

In order to improve heat introduction by lowering viscosity, it is favourable to reduce the viscosity of the plastics melt solution by at least 30%, preferably by at least 50%, in particular by at least 80%, with respect to the plastics melt without solvent at a temperature of substantially 180° C. to 240° C.

In order to obtain products that can be reused for the intended purpose by depolymerisation, it is advantageous to presort the plastics material used in the method according to the invention, so only special plastics materials are supplied to the depolymerisation reactor. Here, it is favourable to use polyolefines, in particular polyethylene and polypropylene, and/or polystyrene as the plastics material.

A suitable temperature for the depolymerisation of pre- or post-consumer plastics wastes is reached once the plastics material is depolymerised in the depolymerisation reactor at approx. 300° C. to 500° C., preferably 350° C. to 450° C.

Regarding further appropriate processing of the plastics material depolymerised in the reactor, it is favourable to extract the depolymerised plastics material in an upper section of the depolymerisation reactor in the form of vapour. The product mixture, which is preferably extracted at the head of the depolymerisation reactor, may then be supplied to a downstream separation column, wherein it is particularly advantageous to separate the vaporous, depolymerised plastics material into several products, preferably a gas flow, liquid gas and naphtha as well as a product similar to gas oil.

In order to make the heat introduction into the plastics material as efficient as possible, it is advantageous to heat the plastics melt solution before introducing it into the depolymerisation reactor. In this way, a substantial part of the heat required for the endothermic cracking reactions as part of depolymerisation may be supplied to the plastics melt solution already before introducing the plastics melt solution into the depolymerisation reactor.

The apparatus of the initially mentioned type is characterised in that a solvent introduction device is provided for adding a fraction obtained from crude oil as a solvent to the plastics melt, thereby lowering the viscosity of the plastics melt solution supplied to the depolymerisation reactor relative to the viscosity of the plastics melt. Using the apparatus according to the invention, it is possible—as in the method according to the invention described above—to reduce the viscosity of the melt introduced into the depolymerisation reactor and thus improve heat introduction. In order to avoid repetitions, reference is made to the advantages discussed in detail in conjunction with the method according to the invention.

For a simple melting and gasification of the plastics material and an efficient introduction of the solvent it is advantageous to provide an extruder as the degassing and melting device and for the solvent introduction device to have at least one dosing pump.

In order to obtain a twist flow in the depolymerisation reactor and thus a continuous mixing of the content within the reactor, it is advantageous to connect to the depolymerisation reactor a supply circuit line via which part of the plastics melt within the depolymerisation reactor is pumped out and recirculated into the depolymerisation reactor. Here, it is favourable to connect the degassing and melting device and/or the solvent introduction device to the supply circuit line since this guarantees that the solvent is added to plastics material that is to be introduced newly into the reactor as well as to plastics material pumped out of the reactor via the supply circuit line, thereby improving heat introduction into the plastics melt.

Provided that a heat exchanger is connected to the supply circuit line, the plastics melt solution may be pre-heated using the heat exchanger already before introducing it into the depolymerisation reactor, in turn improving the efficiency of the energy introduction.

In the following, the invention will be explained in more detail by means of a preferred exemplary embodiment illustrated in the drawing, however, without being limited to it.

The sole FIGURE of the drawing shows a schematic set-up of the method according to the invention and/or the apparatus according to the invention.

It can be seen from the sole FIGURE of the drawing that presorted plastics material, which is composed in particular of polyolefines, preferably polyethylene and/or polypropylene, and polystyrene, if applicable, is supplied to an extruder provided as an introduction device and/or a degassing and melting device 2. The plastics material is compacted, degassed and molten in the extruder 2. The plastics melt leaving the extruder 2 is not supplied to a depolymerisation reactor 3 directly, but passed into a supply circuit line 4. Via the supply circuit line 4, part of the plastics material within the reactor 3 is extracted from above a reactor sump located in the lower portion of the reactor 3 using a pump 5. By introducing a solvent 6 into the supply circuit line 4, the solvent 6 is thus added to the plastics melt extracted from the reactor 3 as well as to the plastics melt supplied by the extruder 2. Before adding the solvent 6 to the plastics melt, the solvent 6 is supplied to a solvent introduction device 6', in which the solvent 6 is pre-heated to approx. 200° C. to 300° C., in particular approx. 250° C.

By introducing the solvent 6 into the supply circuit line 4 via the solvent introduction device 6', which mainly includes nozzles not specified in more detail for injecting solvent 6 into the plastics melt via at least one dosing pump, it is possible to lower the viscosity of the plastics melt which is introduced into the depolymerisation reactor 3. Preferably, pre-heated heavy oil (HFO) is added here in order to obtain a homogeneous solution. Preferably, a heavy oil having an EINECS (European Inventory of Existing Commercial Chemical Substances) Number or CAS (Chemical Abstracts Service) Number selected from Table 1 below and/or a mixture of a variety of these heavy oils is added.

TABLE 1

| EINECS-Number | CAS-Number |
|---|---|
| 269-783-6 | 68333-27-7 |
| 295-990-6 | 92201-59-7 |
| 265-064-6 | 64741-62-4 |
| 269-782-0 | 68333-26-6 |
| 265-063-0 | 64741-61-3 |
| 269-784-1 | 68333-28-8 |
| 274-684-6 | 70592-77-7 |
| 270-984-6 | 68512-62-9 |
| 274-683-0 | 70592-76-6 |
| 265-058-3 | 64741-57-7 |
| 265-189-6 | 64742-86-5 |
| 265-162-9 | 64742-59-2 |
| 273-263-4 | 68955-27-1 |
| 274-685-1 | 70592-78-8 |
| 285-555-9 | 85117-03-9 |
| 292-658-2 | 90669-76-4 |
| 270-796-4 | 68478-17-1 |
| 270-983-0 | 68512-61-8 |
| 271-763-7 | 68607-30-7 |
| 272-184-2 | 68783-08-4 |
| 269-777-3 | 68333-22-2 |
| 265-045-2 | 64741-45-3 |
| 265-181-2 | 64742-78-5 |
| 265-193-8 | 64742-90-1 |
| 308-733-0 | 98219-64-8 |
| 271-013-9 | 68513-69-9 |
| 292-657-7 | 90669-75-3 |
| 273-272-3 | 68955-36-2 |
| 270-792-2 | 68478-13-7 |
| 265-069-3 | 64741-67-9 |
| 265-081-9 | 64741-80-6 |
| 265-082-4 | 64741-81-7 |
| 265-076-1 | 64741-75-9 |
| 309-863-0 | 101316-57-8 |
| 298-754-0 | 93821-66-0 |
| 295-396-7 | 92045-14-2 |
| 272-187-9 | 68783-13-1 |
| 271-384-7 | 68553-00-4 |
| 270-675-6 | 68476-33-5 |
| 270-674-0 | 68476-32-4 |
| 265-057-8 | 64741-56-6 |
| 265-188-0 | 64742-85-4 |
| 295-518-9 | 92062-05-0 |
| 302-656-6 | 94114-22-4 |
| 309-712-9 | 100684-39-7 |
| 309-713-4 | 100684-40-0 |
| 265-043-1 | 64741-43-1 |
| 272-341-5 | 68814-87-9 |
| 272-817-2 | 68915-96-8 |
| 296-468-0 | 92704-36-4 |
| 309-695-8 | 100684-24-0 |
| 265-060-4 | 64741-59-9 |
| 265-062-5 | 64741-60-2 |
| 269-781-5 | 68333-25-5 |
| 271-260-2 | 68527-18-4 |
| 285-505-6 | 85116-53-6 |
| 295-411-7 | 92045-29-9 |
| 308-278-8 | 97926-59-5 |
| 309-865-1 | 101316-59-0 |
| 309-939-3 | 101631-14-5 |
| 307-662-2 | 97675-88-2 |
| 265-049-4 | 64741-49-7 |
| 265-059-9 | 64741-58-8 |
| 265-190-1 | 64742-87-6 |
| 295-407-5 | 92045-24-4 |
| 295-408-0 | 92045-26-6 |
| 295-409-6 | 92045-27-7 |
| 307-750-0 | 97722-01-5 |
| 309-693-7 | 100684-22-8 |
| 309-694-2 | 100684-23-9 |
| 265-092-9 | 64141-90-8 |
| 265-112-6 | 64742-12-7 |
| 265-129-9 | 64742-29-6 |
| 265-148-2 | 64742-46-7 |
| 265-182-8 | 64742-79-6 |
| 265-183-3 | 64742-80-9 |
| 270-719-4 | 68477-29-2 |
| 270-721-5 | 68477-30-5 |
| 292-454-3 | — |
| 292-615-8 | 90640-93-0 |
| 309-667-5 | 100683-97-4 |
| 309-668-0 | 100683-98-5 |
| 309-669-6 | 100683-99-6 |
| 270-671-4 | 68476-30-2 |
| 270-676-1 | 68476-36-6 |
| 270-673-5 | 68476-31-3 |

Tests have revealed that the viscosity in the solution introduced into the depolymerisation reactor 3 relative to the pure plastics melt is significantly lowered by adding such a solvent.

EXAMPLE 1

Samples with adding rates of 0 percent by weight, 50 percent by weight, 70 percent by weight and 100 percent by weight were prepared from pure polypropylene granulate and solvent ("clarified slurry oil", EINECS no. 265-064-6). The mixtures were heated in a nitrogen atmosphere and kept at a preferred process temperature for the depolymerisation method of approx. 360-390° C. for a short time (a few minutes) in order to take into account process conditions as well as to obtain a homogenisation of the samples as complete as possible. Thereafter the dynamic viscosity was measured at the individual measuring temperatures using a cylinder rheometer (type: Bohlin Visco 88 Viscometer) at various reaction rates in the medium setting range of the cylinder.

The following values have been detected consistently and almost independent from shear rates (at medium rates) (the viscosity of the pure solvent could not be determined as the viscosity was out of the measuring range):

TABLE 2

| | Viscosities of mixtures [Pa*s] | | | |
|---|---|---|---|---|
| | Adding rates of solvent (%) | | | |
| Measuring temperature [° C.] | 0 (= pure plastics melt) | 50 | 70 | 100 |
| 180 | 1.9 | 0.17 | 0.03 | n/a |
| 200 | 0.6 | 0.12 | 0.02 | n/a |
| 220 | 0.46 | 0.09 | 0.02 | n/a |
| 240 | 0.37 | 0.06 | 0.01 | n/a |

Advantageously, adding a solvent and thus obtaining a lowering of viscosity also result in higher turbulences within the depolymerisation reactor 3, thereby improving in particular the heat introduction into the molecules of the plastics material. In addition, the drop of the temperature gradient along the radius of the reactor may be reduced in this way, in turn leading to a lower hazard of overheating in the region of the outer frame of the reactor 3 near a jacket-shaped heating device 3' of the reactor and reducing the hazard of coking for the plastics material.

In order to also make the heat introduction for depolymerisation more efficient, a heat exchanger 5' is also provided in the supply circuit line 4, heating the plastics melt solution already before introducing it into the depolymerisation reactor 3.

The plastics material is then depolymerised in the depolymerisation reactor 3 in a temperature range of approx. 350° C. to 450° C. and under substantially atmospheric pressure. Here, a vaporous product is created and extracted from the reactor 3 through an extraction line 7 via the head. The required heat supply for triggering the endothermic cracking reaction for the depolymerisation is obtained by means of the heating device 3' of the depolymerisation reactor 3, on the one hand, and by means of the heat exchanger 5', on the other hand, before introducing the mixture of plastics melt/heavy oil and/or the solution of the supply circuit 4 into the depolymerisation reactor 3.

Furthermore, the residue remaining in the reactor 3 is pumped into a filtering circuit line 8 in the sump of the reactor using a pump 9. The plastics residue that has not been transformed and the coke created during depolymerisation are filtered from the sump product, which is partially recirculated into the depolymerisation reactor 3, by means of filters 10. The plastics material transported in the filtering circuit line 8 may also be heated in a heat exchanger not specified in more detail before being recirculated into the reactor 3. An especially high-boiling part is branched off from the filtering circuit line 8 as a side product 11.

The vaporous product mixture extracted via the extraction line 7 at the head of the reactor 3 is supplied to a downstream separation column 12. In the separation column 12 the product mixture is separated into three product flows by distillation. Substantially, it is separated into a gas flow 13, liquid gas (LPG—liquefied petroleum gas), i.e. propane, butane and their mixtures, and a naphtha-containing product 14 as well as products 15 similar to gas oil.

By adding the solvent 6 to the plastics melt, it is possible to operate a comparably large depolymerisation reactor with a turnover volume of much more than 6,000 tonnes per year, preferably more than 100,000 tonnes per year, in an economically profitable manner, wherein the lowering of the viscosity of the plastics melt does not only allow an improved heat introduction into the plastics material, but also makes it possible to reduce the energy consumption for the operation of the pumps 5, 9 of the lines 4, 8 of the supply circuit and the filtering circuit. Another advantage is that a stirring device in the reactor may also be omitted to reduce energy consumption even further.

The invention claimed is:

1. A method for the depolymerisation of plastic material by means of heat introduction and thermal cracking, comprising:
    melting the plastic material to form a plastic melt,
    degassing the plastic melt,
    adding a fraction of crude oil to the plastic melt as a solvent to yield a plastic melt solution, and wherein a heavy oil having a final boiling point of greater than 300° C. and comprising at least 25% by weight aromatic hydrocarbons is used as the solvent,
    lowering the viscosity of the plastic melt solution by at least 30% relative to the viscosity of the plastic melt without the solvent at a temperature of about 180° C. to 240° C., by using the solvent in an amount such that the solvent is at least 50% by weight of the plastic melt solution,
    passing the plastic melt solution to a depolymerisation reactor, and
    heating the plastic melt solution in the depolymerisation reactor to depolymerise the plastic material by thermal cracking and produce a depolymerised product.

2. The method according to claim 1, wherein part of the plastic melt within the depolymerisation reactor is pumped out and recirculated into the depolymerisation reactor via a supply circuit.

3. The method according to claim 2, wherein plastic melt is continuously pumped from the depolymerisation reactor and recirculated into the depolymerisation reactor.

4. The method according to claim 2, wherein the solvent is introduced into the supply circuit.

5. The method according to claim 2, wherein the plastic melt to be depolymerised is introduced into the depolymerisation reactor via the supply circuit.

6. The method according to claim 1, wherein the solvent is heated before it is added to the plastic melt.

7. The method according to claim 6, wherein the solvent is heated to at least about 150° C. before it is added to the plastic melt.

8. The method according to claim 6, wherein the solvent is heated to 200° C. to 300° C. before it is added to the plastic melt.

9. The method according to claim 1, wherein a heavy oil has a final boiling point of greater than 350° C.

10. The method according to claim 1, wherein a heavy oil having no. 265-xxx-x or no. 270-xxx-x in the EINECS classification system, with x being a placeholder, is added as the solvent.

11. The method according to claim 1, wherein a heavy oil selected from a group consisting of EINECS Nos. 265-064-6, 265-058-3, 265-189-6, 265-045-2, 265-193-8, 265-081-9, 270-675-6, 265-060-4 and a mixture thereof is added as the solvent.

12. The method according to claim 1, wherein polyolefins are used as the plastic material.

13. The method according to claim 1, wherein polyethylene and polypropylene, and/or polystyrene are used as the plastic material.

14. The method according to claim 1, wherein the plastic material is pre- or post-consumer plastic waste.

15. The method according to claim 1, wherein the plastic material is depolymerised in the depolymerisation reactor at about 300° C. to 500° C.

16. The method according to claim 1, wherein the plastic material is depolymerised in the depolymerisation reactor at about 350° C. to 450° C.

17. The method according to claim 1, wherein the depolymerised product is extracted in an upper section of the depolymerisation reactor in the form of vapour.

18. The method according to claim 17, wherein the vaporous, depolymerised product is separated into at least three products.

19. The method according to claim 1, wherein the plastic melt solution is heated before introduction into the depolymerisation reactor.

20. The method according to claim 1, wherein the viscosity of the plastic melt solution is reduced by at least 80% with respect to the plastic melt without solvent at a temperature of about 180° C. to 240° C.

21. A method for the depolymerisation of plastic material by means of heat introduction and thermal cracking, comprising:

melting the plastic material to form a plastic melt, degassing the plastic melt, heating a fraction of crude oil to at least about 150° C. to be used as a solvent, wherein a heavy oil having a final boiling point of greater than 300° C. and comprising at least 25% by weight aromatic hydrocarbons is used as the solvent, adding the solvent to the plastic melt to create a plastic melt solution, passing the plastic melt solution to a depolymerisation reactor, wherein the solvent content of the plastic melt solution supplied to the depolymerisation reactor is at least 50% by weight, thereby lowering the viscosity of the plastic melt solution by at least 30% relative to the viscosity of the plastic melt without the solvent at a temperature of about 180° C. to 240° C., and heating the plastic melt solution to depolymerise the plastic material by thermal cracking and produce a depolymerised product.

\* \* \* \* \*